United States Patent [19]

Shimizu et al.

[11] Patent Number: 4,622,245
[45] Date of Patent: Nov. 11, 1986

[54] METHOD FOR PREVENTING POLYMER SCALE DEPOSITION IN THE POLYMERIZATION OF AN ETHYLENICALLY UNSATURATED MONOMER

[75] Inventors: Toshihide Shimizu, Chiba; Ichiro Kaneko; Yoshiteru Shimakura, both of Ibaraki, all of Japan

[73] Assignee: Shin-Etsu Chemical Co., Ltd., Tokyo, Japan

[21] Appl. No.: 660,719

[22] Filed: Oct. 15, 1984

[30] Foreign Application Priority Data

Oct. 31, 1983 [JP] Japan .................. 58-204187

[51] Int. Cl.⁴ ................................. C08F 0/2
[52] U.S. Cl. .................... 427/230; 526/62; 427/239
[58] Field of Search ............ 526/62; 427/230

[56] References Cited

FOREIGN PATENT DOCUMENTS 0118407 9/1981 Japan ........................ 526/62
0185301 11/1982 Japan ........................ 526/62

Primary Examiner—Sam Silverberg
Attorney, Agent, or Firm—Toren, McGeady, Stanger, Goldberg & Kiel

[57] ABSTRACT

The invention provides a novel method for preventing deposition of polymer scale on the walls of a polymerization reactor in the course of polymerization of various ethylenically unsaturated monomers such as the suspension polymerization of vinyl chloride in an aqueous medium. The method comprises coating the reactor walls with a coating solution containing (a) a polymeric compound having hydroxyl groups such as a polyvinyl alcohol and (b) a silicic acid compound such as water glass followed by drying of the coated surface and washing thereof with water.

3 Claims, No Drawings

METHOD FOR PREVENTING POLYMER SCALE DEPOSITION IN THE POLYMERIZATION OF AN ETHYLENICALLY UNSATURATED MONOMER

BACKGROUND OF THE INVENTION

The present invention relates to a method for preventing polymer scale deposition on the reactor walls in the polymerization of an ethylenically unsaturated monomer such as vinyl chloride and styrene and a coating composition used therefor. The invention also relates to a method for preventing adhesion of polymers on the walls of a storage tank or salting-out tank of polymer latexes as well as walls of apparatuses used for processing of polymer products.

Ethylenically unsaturated monomers are polymerized in several types of polymerization procedures including suspension polymerization, emulsion polymerization, solution polymerization, gas-phase polymerization and bulk polymerization. One of the difficult problems common to all of these polymerization procedures in the prior art is the deposition of polymer scale on the inner walls of the reactor and the surfaces of other equipments such as the stirrer and the like coming into contact with the monomer under polymerization.

That is, when an ethylenically unsaturated monomer is polymerized in either one of the above mentioned polymerization procedures, the polymer is deposited more or less on the inner walls of the reactor and the surfaces of the stirrer and other equipments coming into contact with the monomer to form scale thereon so that various disadvantages are unavoidable such as the decrease in the yield of the desired polymer and lowered cooling capacity of the polymerization reactor as well as degraded quality of the polymer product due to the polymer scale eventually entering the polymer product as coming off the reactor walls. In addition, such polymer scale on the reactor walls must be removed taking a great deal of time and labor in order to prepare the polymerization reactor for the next run of the polymerization. The scale removing works by man power present a very serious problem of safety against human body because the polymer scale usually contains a considerably large amount of the unreacted monomer absorbed therein which is sometimes toxic as is a matter of very serious concern in recent years in the case of vinyl chloride in particular.

A number of methods have been proposed hitherto to prevent the polymer scale deposition on the reactor walls. Exemplary of such methods, in particular, for the suspension polymerization of vinyl chloride are a method in which the reactor walls and the surfaces of the stirrer and the like are coated, prior to polymerization, with a polar organic compound such as amine compounds, quinone compounds, aldehyde compounds and the like or a dye or pigment (see, for example, Japanese Patent Publication Nos. 45-30343 and 45-30835), a method in which the walls and surfaces are coated with a polar organic compound or a dye having been treated with a metal salt (see Japanese Patent Publication No. 52-24953), a method in which the coating material is a mixture of an electron donor compound and an electron acceptor compound (see Japanese Patent Publication No. 53-28347) and a method in which the coating material is an inorganic salt or an inorganic complex compound (see Japanese Patent Publication No. 52-24070).

Each of these prior art methods, however, has its own respective advantages and disadvantages. For example, difficulties are encountered in the coating works with some of the coating compositions and the velocity of the polymerization reaction may sometimes be retarded by the influence of the scale-preventing coating composition or the quality of the product resin obtained by use of a large amount of the coating composition may be poor due to the contamination of the resin product with the ingredients in the coating composition. Some of the ingredients in the hitherto proposed coating compositions are even corrosive to the material of the polymerization reactor. Accordingly, it has been eagerly desirted to develop an efficient method for preventing deposition of polymer scale on the walls of a polymerization reactor as well as other apparatuses used for processing the polymer products.

SUMMARY OF THE INVENTION

Thus, an object of the present invention is to provide a novel and efficient method for preventing deposition of polymer scale on the walls of a polymerization reactor or an apparatus used for processing the polymer product free from the above described problems in the prior art methods.

Another object of the invention is to provide a coating composition used in the above described method free from the disadvantages and problems in the prior art coating compositions used for the same purpose.

The coating composition according to the invention used for coating vessel walls with the above described object comprises a polymeric compound having at least one hydroxyl group in a molecule and a silicic acid compound as dissolved in a solvent.

Accordingly, the method of the invention for preventing deposition of polymer scale on the vessel walls comprises coating the wall surfaces with a coating composition comprising a polymeric compound having at least one hydroxyl group in a molecule and a silicic acid compound dissolved in a solvent and then drying the thus coated wall surfaces.

DETAILED DESCRIPTION OF THE PREFERRED EMBODIMENTS

According to the method of the present invention, a very remarkable effect is obtained for preventing polymer scale deposition on the reactor walls regardless of the type of the polymerization procedure which may be suspension polymerization, emulsion polymerization, bulk polymerization and others and regardless of the material of which the polymerization reactor or at least the surface layer of the reactor is made including stainless steel, carbon steel, nickel lining, Monel metal lining, titanium lining and glass lining. Further, the effect of the inventive method is not influenced by the kind of the monomer or monomers under polymerization as well as the polymerization initiator and other ingredients pertaining to the polymerization in the reactor having the inner surfaces coated according to the invention. The inventive method is effective for preventing polymer scale deposition also in the storage tanks and salting-out tanks of latexes as well as other kinds of vessels and equipments for handling or processing of polymer products.

One of the essential ingredients in the coating composition of the present invention is a polymeric compound having at least one hydroxyl group per molecule exemplified by starches and related compounds such as amylose, amylopectin, dextrin, oxidized starch, acetylstarch, nitrostarch, methylstarch, carboxymethylstarch and the like, mucous fluids of plant or vegetable origin such as pectic acid, protopectin, pectinic acid, algin or alginic acid, laminarin, fucoidin, agar, carragheenin and the like, mucous fluids of animal origin such as hyaluronic acid, chondroitin sulfate, heparin, keratosulfate, chitin, charonin sulfate and the like, nucleic acid compounds such as ribonucleic acid, deoxyribonucleic acid and the like, cellulose derivatives such as methylcellulose, ethylcellulose, carboxymethyl cellulose, hydroxyethylcellulose, benzylcellulose, cyanoethylcellulose, methylene ether of cellulose, triphenylmethylcellulose, formylcellulose, cellulose acetate, cellulose propionate, cellulose butyrate, cellulose acetate propionate, sulfonic acid ester of cellulose, carbamic acid ester of cellulose, nitrocelluose, cellulose phosphate, cellulose xanthate and the like, hemicelluloses such as xylan, mannan, arabogalactan and the like, lignic derivatives such as alcohol lignin, dioxane lignin, phenol lignin, hydrotropic lignin, mercapto lignin, lignin thioglycolate, lignin sulfonate, alkali lignin, thioalkali lignin, acid lignin, copper oxide-ammonia lignin, lignin periodate and the like, gelatin, phenol-formaldehyde resins, polyvinyl alcohols such as partially saponified polyvinyl alcohols and the like, and others.

The other essential ingredient in the coating composition of the invention is a silicic acid compound exemplified by orthosilicic acid, metasilicic acid, mesodisilicic acid, mesotrisilicic acid, mesotetrasilicic acid, sodium metasilicate, sodium orthosilicate, sodium disilicate, sodium tetrasilicate, potassium metasilicate, potassium hydrogendisilicate, lithium orthosilicate, hexalithium orthosilicate, water glass, 12-silicotungstic acid, iso-12-silicotungstic acid, 10-silicotungstic acid, potassium 12-silicotungstate, sodium 12-silicotungstate, silicomolybdic acid, potassium silicomolybdate, sodium silicomolybdate, tetraethyl orthosilicate and the like.

In practicing the method of the present invention, an aqueous coating composition is first prepared by dissolving the above described hydroxyl-containing polymeric compound and the silicic acid compound in water each in a concentration suitable for the coating works. Though not particularly limitative, the concentration of the hydroxyl-containing polymeric compound is preferably at least about 0.01% by weight since no coating film having a desired thickness can be obtained with an aqueous coating solution containing the polymer in a lower concentration. The upper limit of the concentration of the polymeric compound is usually about 5% by weight since an excessively high concentration of the coating solution is accompanied by an economical disadvantage and, in an extreme case, difficulties in the coating works. The concentration of the silicic acid compound in the aqueous coating solution is usually in the range from about 0.01 to 5% by weight.

The solvent used for the preparation of the coating solution is not limited to water alone and may be a mixture of water and a water-miscible organic solvent such as alcoholic solvents, ester solvents and ketone solvents and combined use of such an organic solvent with water may have an advantage to accelerate vaporization of the solvent and drying of the coating film on the reactor walls after coating.

In addition to the above mentioned preferable concentrations of the ingredients, the pH value of the aqueous coating solution is also of some significance to the efficiency of polymer scale prevention. In particular, the aqueous coating solution should preferably have an acidic pH value of 7.0 or below by the addition of a suitable acid such as sulfuric, hydrochloric, phosphoric, nitric, carbonic, perchloric, molybdic, tungstic and the like inorganic acids and formic, acetic, oxalic, lactic, maleic, glycolic, thioglycolic, phytic and the like organic acids. It is convenient that an aqueous solution of the acid having a relatively low concentration is prepared in advance and the aqueous acid solution is used in the preparation of the inventive coating composition.

The thus prepared aqueous coating solution is used for coating the inner walls of a polymerization reactor or other surfaces coming into contact with the monomer or monomers during polymerization as well as other surfaces susceptible to the deposition of polymer thereon such as the inner walls of storage tanks and salting-out tanks of latexes as well as conduit tubes thereof and the thus coated surfaces are dried. For example, the surface coated with the aqueous coating solution may be dried by blowing hot air thereto or, alternatively, the surface to be coated is heated in advance at an elevated temperature of, for example, 40° to 100° C. and coating with the coating solution is performed on the thus heated surface so that the solvent in the solution evaporates rapidly as it is applied. It is desirable that the coated and dried surface is then thoroughly washed with water to remove any water-soluble materials in the coating film.

The amount of coating as dried should preferably be at least 0.001 g/m$^2$ in order to obtain full exhibition of the desired effect of polymer scale prevention.

When the inventive method is applied to a polymerization process of a monomer or monomers in a polymerization reactor, the procedure of coating with the coating solution, drying and washing with water of the reactor walls is followed in a conventional manner by the introduction of the ingredients pertaining to the polymerization reaction including, for example, water as the polymerization medium, vinylic monomer or monomers, polymerization initiator, dispersing agent of the monomer and other necessary ingredients to start the polymerization reaction. The method of the invention is of course effective in the suspension polymerization and emulsion polymerization of vinylic monomers in which the polymerization mixture contains, in addition to the aqueous polymerization medium, a suspending agent such as a partially saponified polyvinyl alcohol and methylcellulose, anionic surface active agent such as sodium laurylsulfate, sodium dodecylbenzene sulfonate and sodium dioctylsulfosuccinate, non-ionic surface active agent such as sorbitan monolaurate and polyoxyethylene alkyl ether, chain transfer agent such as trichloroethylene and mercaptans, pH controlling agent and polymerization initiator such as diisopropylperoxy dicarbonate, $\alpha,\alpha'$-azobis-2,4-dimethyl valeronitrile, lauroyl peroxide, potassium persulfate, cumene hydroperoxide and p-menthane hydroperoxide and the effectiveness of the inventive method is not influenced by the presence of these ingredients in the polymerization mixture.

The type of the monomer or monomers to be polymerized also has little influences on the effectiveness of the inventive method including vinyl halides such as vinyl chloride, vinyl esters such as vinyl acetate and propionate, acrylic and methacrylic acids as well as esters and salts thereof, maleic and fumaric acids and esters thereof as well as maleic anhydride, dienic monomers such as chloroprene, butadiene and isoprene, styrene, acrylonitrile, vinylidene halides and vinyl ethers.

In the following, the coating composition and the method for preventing polymer scale deposition according to the invention are described in more detail by way of examples.

EXAMPLE 1

Aqueous coating solutions were prepared according to the formulations indicated in Table 1 below including a hydroxyl-containing polymeric compound as the component (a) and a silicic acid compound as the component (b) each in a concentration to give an overall concentration of 0.5% by weight as the total of the components (a) and (b). The thus prepared aqueous coating solution was applied onto the inner walls and the surface of the stirrer of a stainless steel-made polymerization reactor of 100 liter capacity heated in advance at 80° C. and kept for 15 minutes after coating at the temperature to be dried followed by washing with water. In Table 1 and hereafter, the abridgements of PVA and CMC are for a polyvinyl alcohol and a sodium salt of carboxymethyl cellulose, respectively. The coating amount of the coating solution on the walls as dried is given in Table 1 for each of the experiments.

Into the thus treated polymerization reactor were introduced 26 kg of vinyl chloride monomer, 52 kg of water, 26 g of a partially saponified polyvinyl alcohol and 8 g of di-2-ethylhexylperoxy dicarbonate to form a polymerization mixture and the polymerization reaction was performed by continuously agitating the mixture at 57° C. for 10 hours followed by discharge of the polymerizate slurry out of the reactor. The polymerization run as above was repeated after a single coating treatment and the number of the polymerization runs was recorded which could be performed without polymer scale deposition on the reactor walls in an amount exceeding 1 g/m$^2$ to give the results shown in Table 1 under the heading of "Times of scale prevention".

EXAMPLE 2

The inner walls of a stainless steel-made polymerization reactor of 300 liter capacity and the surface of the stirrer installed therein were coated in advance with a coating solution prepared according to one of the formulations shown in Table 2 and dried by heating at 50° C. for 15 minutes followed by washing with water. The coating amount of the coating solution as dried is shown in Table 2 for each of the experiments. Then, 60 kg of styrene monomer, 40 kg of acrylonitrile monomer, 100 kg of water, 2 kg of hydroxyapatite, 40 g of sodium laurylsulfate, 300 g of tert-dodecylmercaptan and 400 g of lauroyl peroxide were introduced into the polymerization reactor to form a polymerization mixture which was heated and agitated at 70° C. for 1 hour followed by temperature elevation to 80° C. taking 2 hours and co-polymerization of the monomers was completed by heating the mixture at 80° C. for 1 hour under agitation. After completion of the polymerization, the polymerizate slurry was discharged out of the reactor and the amount of polymer scale deposition on the reactor walls was examined to give the results shown in Table 2.

TABLE 1

| Experiment No. | Coating solution Hydroxyl-containing polymer (a) | Silicic acid compound (b) | Weight ratio of (a)/(b) | Acid for pH control | pH of coating solution | Coating amount as dried, g/m$^2$ | Times of scale prevention |
|---|---|---|---|---|---|---|---|
| 1 | PVA | — | — | — | — | 0.01 | 0 |
| 2 | PVA | — | 100/0 | — | 6.8 | 0.01 | 0 |
| 3 | — | — | 100/0 | Sulfuric acid | 2.5 | 0.01 | 0 |
| 4 | — | Water glass | 0/100 | — | 10.6 | 0.01 | 0 |
| 5 | — | " | 0/100 | Sulfuric acid | 2.5 | 0.01 | 0 |
| 6 | PVA | " | 70/30 | — | 10.5 | 0.01 | 5 |
| 7 | PVA | " | 70/30 | Sulfuric acid | 2.5 | 0.01 | 12 |
| 8 | Methylcellulose | " | 30/70 | Phosphoric acid | 3.0 | 0.05 | 10 |
| 9 | Chondroitin sulfate | " | 50/50 | " | 5.0 | 0.06 | 8 |
| 10 | Dextrin | " | 70/30 | " | 2.5 | 0.005 | 11 |
| 11 | CMC | " | 50/50 | " | 3.0 | 0.1 | 10 |
| 12 | Algin | " | " | " | " | 0.2 | 10 |
| 13 | Lignosulfonic acid | " | " | " | " | 0.02 | 11 |
| 14 | Gelatin | " | " | " | " | 0.2 | 10 |
| 15 | Mannan | " | " | " | " | 0.5 | 9 |
| 16 | PVA | Tetraethyl silicate | " | Sulfuric acid | " | 0.01 | 18 |
| 17 | PVA | " | 90/10 | " | " | 0.015 | 15 |
| 18 | PVA | " | 10/90 | " | " | 0.7 | 14 |
| 19 | Chondroitin sulfate | " | 50/50 | " | " | 0.01 | 12 |
| 20 | Lignosulfonic acid | " | 50/50 | " | " | 0.15 | 12 |

TABLE 2

| Experiment No. | Coating solution Hydroxyl-containing polymer (a) | Silicic acid compound (b) | Weight ratio of (a)/(b) | Acid for pH control | pH of coating solution | Coating amount as dried, g/m$^2$ | Amount of scale deposition, g/m$^2$ |
|---|---|---|---|---|---|---|---|
| 21 | — | — | — | — | — | — | 650 |
| 22 | PVA | — | 100/0 | — | 6.8 | 0.01 | 610 |
| 23 | PVA | — | 100/0 | Sulfuric acid | 2.5 | 0.01 | 600 |
| 24 | — | Sodium metasilicate | 0/100 | " | 10.8 | 0.02 | 620 |
| 25 | — | " | 0/100 | " | 2.5 | 0.03 | 580 |
| 26 | PVA | " | 50/50 | — | 10.7 | 0.05 | 11 |
| 27 | PVA | " | " | Sulfuric acid | 2.5 | 0.1 | 3 |
| 28 | Amylose | Lithium silicate | " | Hydrochloric acid | 3.0 | 0.3 | 0 |
| 29 | Pectic acid | Sodium 12-silicotungstate | " | " | " | 0.9 | 2 |
| 30 | Chitin | Tetraethyl silicate | " | " | " | 0.5 | 4 |
| 31 | Hydroxyethyl cellulose | " | " | " | " | 0.01 | 6 |

TABLE 2-continued

| Experiment No. | Coating solution | | | | | Coating amount as dried, g/m² | Amount of scale deposition, g/m² |
|---|---|---|---|---|---|---|---|
| | Hydroxyl-containing polymer (a) | Silicic acid compound (b) | Weight ratio of (a)/(b) | Acid for pH control | pH of coating solution | | |
| 32 | Xylan | " | " | " | " | 0.007 | 3 |
| 33 | Alkali lignin | " | " | " | " | 0.01 | 2 |
| 34 | PVA | " | " | " | " | 1.0 | 0 |

What is claimed is:

1. A method for preventing deposition of polymer scale on the walls of a polymerization reactor which comprises coating the wall surface with a coating composition comprising (a) a polymeric compound having at least one hydroxyl group in a molecule and (b) a silicic acid compound dissolved in a solvent and then drying the thus coated wall surface.

2. The method as claimed in claim 1 wherein the coating composition has a value of pH of 7.0 or below.

3. The method as claimed in claim 1 wherein the coating and drying of the reactor walls is followed by washing with water.

* * * * *